Oct. 12, 1937.  C. WURR  2,095,404

SERVOMOTOR

Filed Aug. 4, 1936

Inventor
Carl Wurr
By A. D. Adams
Attorney

Patented Oct. 12, 1937

2,095,404

UNITED STATES PATENT OFFICE 2,095,404

SERVOMOTOR

Carl Wurr, Berlin-Lichterfelde, Germany, assignor to Askania-Werke A. G. vormals Central Werkstatt Dessau und Carl Bamberg-Friedenau, a German company Application August 4, 1936, Serial No. 94,265
In Germany November 30, 1935

1 Claim. (Cl. 121—38)

This invention relates to hydraulic motors such as are employed in jet pipe regulators and, among other objects, aims to provide a greatly improved and relatively simple motor capable of imparting rotary movement of more or less than 360° to a control shaft.

Figure 1:
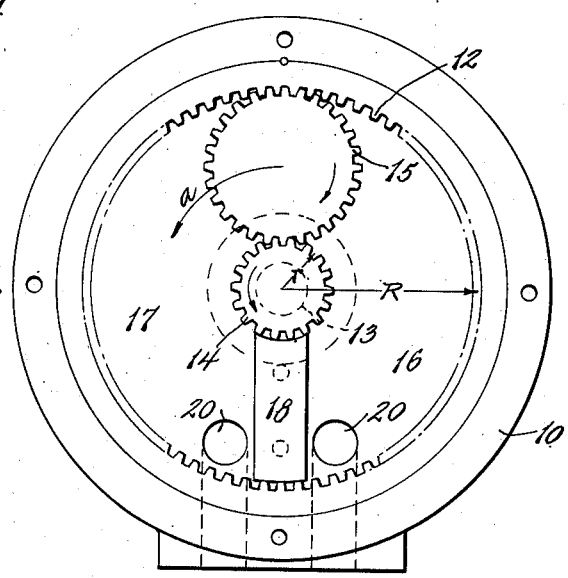
Figure 2:
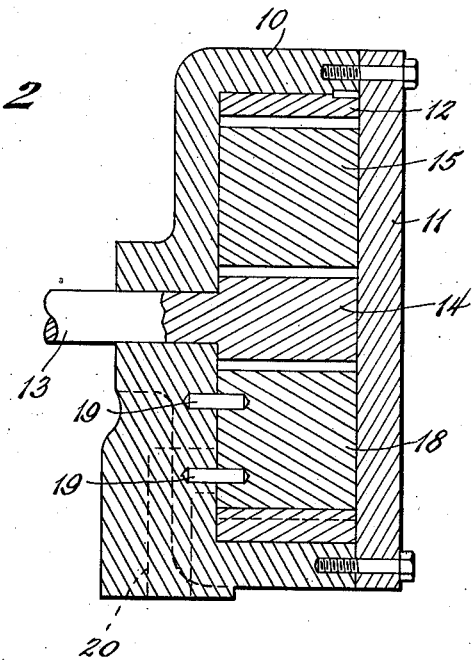

Other aims and advantages of the invention will appear in the specification, when considered in connection with the accompanying drawing, wherein:

Fig. 1 is a side elevation of a gear motor embodying the invention, the cover plate being removed; and Fig. 2 is a vertical sectional view of the motor shown in Fig. 1.

In hydraulic or pneumatic controls, such as are usually employed in regulators, the servo-motors of the oscillating type have been limited to angular movement of less than 360° or one revolution and, in most cases, to less than 180°. In many installations, it is desirable to impart an angular movement of more than 360° to a control shaft in response to variations in the condition impulses. This invention, therefore, provides a novel type of servo-motor employing a planetary gear piston connected to impart rotation through any angle, up to several revolutions, to a control shaft.

Referring particularly to the drawing, the illustrative embodiment of the motor is adapted to be driven by differential fluid pressure, created, for example, by a jet pipe relay or delivered from any suitable source (not shown). In this example, the motor is shown as having a cylindrical housing or casing 10 and a cover plate 11. An internal ring gear 12 is suitably secured within the casing and a driven shaft 13 carries a pinion or spur gear 14 in the center of the casing meshing with a planetary or floating gear 15 which, in turn, meshes with the internal ring gear 12 and acts as a piston.

The interior of the casing is divided into two fluid chambers 16 and 17 by a radial partition 18 between the spur gear 14 and the ring gear 12 and secured in any suitable manner to the casing, pins 19 being shown for illustrative purposes. The gears and partition are closely fitted in the casing to make the chambers fluid tight. Pressure fluid is admitted to and discharged from the casing through conduits 20 on opposite sides of and adjacent to the partition 18. The arrangement is such that the planetary gear piston 15 will be actuated in either direction by a difference in pressure in the two chambers and it can rotate until it strikes the partition 18. If the pressure in chamber 16 is higher than the pressure in chamber 17, the gear 15 will try to turn clockwise as viewed in Fig. 1. Such movement of this gear is only possible when it drives the spur gear 14 in a counter-clockwise direction because of the intermeshing relation between the gears. This will result in angular movement of the axis of gear 15 and rotation at a greater speed will be imparted to spur gear 14 and the driven shaft. The radius of the ring gear 12 is R and the radius of the spur gear 14 is r. Assuming that the planetary gear 15 moves through an angle (a), as indicated, the gear 14 will rotate through an angle represented by the equation $$x = a(R/r + 1)$$

Therefore, the angular movement of the driven shaft 13 may be much greater than 360°, depending upon the ratio between the pitch diameters of the ring gear 12 and the spur gear 14.

From the foregoing description, it will be apparent that motors of this type are very simple in design and easy to manufacture. The gears are self-sealing and prevent leakage from one chamber to the other. The greater the differential pressure, the more effective is the seal because the pressure is imparted to the intermeshing teeth. This is a very decided advantage over the well known types of servomotors having vanes or blades capable of oscillating through less than 360° because the leakage past the vanes or blades increases as the differential pressure increases. Moreover, the motors are adapted for many commercial uses and will serve the same purpose as the more complex reversible rotary motors. They may be made in the form of very compact units and are, therefore, well adapted for use as control motors.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

A fluid motor comprising, in combination, a cylindrical casing; an internal ring gear secured in the casing; a spur gear mounted in the center of the casing; a shaft connected to said gear; a planetary gear acting as a piston meshing with said ring gear and said spur gear; a partition dividing said casing into a pair of fluid chambers on opposite sides of said planetary gear; and fluid conduits communicating with said chambers.

CARL WURR.